:::

United States Patent Office 3,579,580
Patented May 18, 1971

---

3,579,580
PROCESS FOR PREPARING 1,4-BENZODIAZEPINES
Giles A. Archer, Essex Fells, and Leo Henryk Sternbach, Upper Montclair, N.J., assignors to Hoffmann-La Roche Inc., Nutley, N.J.
No Drawing. Filed July 26, 1966, Ser. No. 567,827
Int. Cl. C07c *119/00*
U.S. Cl. 260—566
5 Claims

ABSTRACT OF THE DISCLOSURE

Preparation of 1,4-benzodiazepines via the reaction of 2 - ( 2 - amino - 5 -Y-α-phenylbenzylideneamino)ethanol wherein Y is selected from the group consisting of halogen, nitro, trifluoromethyl and hydrogen with a leaving group providing agent, e.g. thionyl chloride whereby to obtain the novel corresponding 2-(2-amino-5-Y-α-phenyl-benzylideneamino)ethyl X wherein X is a leaving group and ring closing the last-mentioned compound whereby to obtain a 1,4-benzodiazepine. 1,4-benzodiazepines are known compounds of pharmacological utility, and are useful as anticonvulsant, muscle relaxant and sedative agents.

DETAILED DESCRIPTION OF THE INVENTION

The present invention relates to novel chemical processes and to novel intermediates. More particularly, the present invention relates to novel chemical processes for preparing known compounds useful as pharmacological agents by virtue of their pharmaceutical activity and to novel intermediates useful in such preparative techniques.

The aforementioned known compounds which result from a performance of the novel process disclosed in the subject application can be characterized broadly in a chemical sense as being 2,3-dihydro-5-phenyl-1H-1,4-benzodiazepines and are of the formula

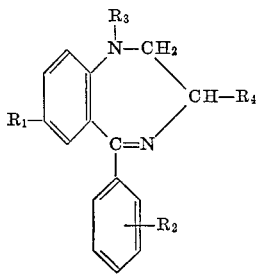

I wherein $R_1$ is selected from the group consisting of halogen, preferentially, chlorine and bromine, nitro, trifluoromethyl and hydrogen; $R_2$ is selected from the group consisting of hydrogen and halogen, and $R_3$ and $R_4$ are each selected from the group consisting of hydrogen and lower alkyl. Preferred are those compounds of the Formula I above wherein $R_2$ and $R_4$ are hydrogen. More preferred are those compounds of the Formula I above wherein $R_2$ and $R_4$ are both hydrogen and $R_1$ is chlorine or bromine. Most preferred are compounds of the Formula I wherein $R_2$ and $R_4$ are hydrogen, $R_1$ is chlorine and $R_3$ is methyl or hydrogen.

By the term, halogen, all four forms thereof are intended, e.g. bromine, chlorine, fluorine and iodine, unless otherwise specified. By the term "lower alkyl" straight or branched chain hydrocarbon groups having 1–7 carbon atoms in the chain are contemplated such as methyl, ethyl and the like.

The object of the present invention is to provide a new and useful process for preparing such known pharmaceutically useful compounds as are encompassed by the Formula I above.

The said new and useful process for preparing compounds of the Formula I above involves, in its first stage, reacting a compound of the formula

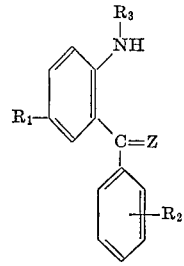

II wherein $R_1$, $R_2$ and $R_3$ are as above and Z is selected from the group consisting of O, NH and N-lower alkyl, with a compound of the formula

III wherein $R_4$ is as above, whereby to prepare a compound having the formula

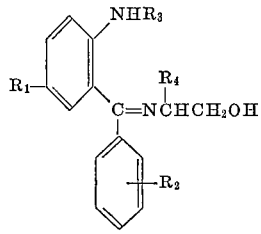

IV wherein $R_1$, $R_2$, $R_3$ and $R_4$ are as above.

Compounds of the Formula II above wherein Z is selected from the group consisting of O and NH are preferred.

The first stage of the preparative technique illustrated above proceeds at any suitable temperature and pressure and thus, reaction conditions are not critical to a successful performance of this process stage. However, in a preferred aspect, elevated temperatures are employed, e.g. at about the reflux temperature of the reaction mass.

In one process aspect, a compound of the Formula II above is heated with a compound of the Formula III above. The compound of the Formula III above can be provided in excessive amounts whereby it can serve as the solvent medium. However, in a less preferred process aspect, the first stage is effected in the presence of a solvent medium such as xylene, higher alkanols such as hexanol and the like. Obviously, the temperature employed in either process aspect should not be so high as to result in loss of the solvent medium and/or in decomposition of the reactants or resulting product.

The second stage of the preparative technique which constitutes the present invention involves reacting a compound of the Formula IV above with any agent capable of effecting the replacement of the terminal OH group of the compound of the Formula IV above with a suitable leaving group. When utilizing such agents, there is provided a compound of the formula

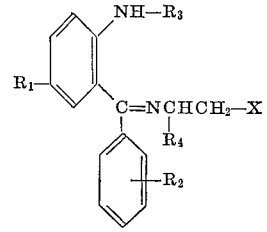

V wherein $R_1$, $R_2$, $R_3$ and $R_4$ are as above and X is any suitable leaving group.

Any leaving group which will function efficaciously for the purposes of the present invention is included within the purview thereof. In the most advantageous aspect, bromine and chlorine is present as the group X and thus, X is advantageously selected from the group consisting of chlorine and bromine. The replacement of the terminal group of the compound of the Formula IV above whereby to prepare a corresponding compound of the Formula V above wherein X is selected from the group consisting of bromine and chlorine, is advantageously effected by treating a compound of the Formula IV above with such leaving group-providing agents as thionyl chloride, phosphorus tribromide and the like. Such treatment is effected, preferentially, in the presence of an inert organic solvent such as methylene chloride and at elevated temperatures, e.g. at about the reflux temperature of the reaction mass.

However, it should be readily apparent to those skilled in the art that any appropriate leaving group such as other members of the halogen family, an aryl-sulfonyl group, e.g. tosyl, an alkyl sulfonyl group, e.g. mesyl and the like can be utilized as X. All that is required of the leaving group X is that it be suitable for the purposes of the present invention, that is, that it permit formation of a compound of the Formula I by ring closure of a corresponding compound of the Formula V above. Suitably, leaving group providing agents such as thionyl chloride, thionyl bromide, phosphorus oxychloride, phosphorus pentachloride, phosphorus tribromide, p-toluenesulfonyl chloride and methanesulfonyl chloride can be utilized to effect conversion of a compound of the Formula IV above to the corresponding compound of the Formula V above.

To effect ring closure of the compound of the Formula V above to the corresponding compound of the Formula I above, the former is heated preferably at a temperature range from about 50° C. to about 250° C. In one aspect, an acid acceptor is present when heating a compound of the Formula V above to the corresponding compound of the Formula I above. If an acid acceptor is utilized, an excess of the acid acceptor may be provided whereby it can also serve as the medium in which the ring closure occurs. By this simple expedient, there can be provided to the reaction zone, a single substance which serves a two-fold purpose; namely, as acid acceptor and reaction medium. However, it is preferred that ring closure be effected by simply heating a compound of the Formula V above in the absence of a solvent medium and/or an acid acceptor, preferably, with agitation. In another, but less preferred aspect, the reaction can be conducted in the presence of an inert organic solvent. Representative of inert organic solvents useable in this process variation are xylene, toluene and the like, halogenated aromatic hydrocarbons such as chlorobenzene and the like, dimethylformamide, dimethylsulfoxide, quinoline, a lower alkanol such as methanol, an ether such as bis(2-methoxyethyl)ether and any other suitable inert organic solvent. Suitably, the preferred temperature range for effecting ring closure is from about 50° C. to about 250° C.

Compounds of the Formula V above occur in two isomeric forms, namely, the syn-form and the anti-form. They can be resolved into their isomeric forms and each of the so-obtained stereoisomers can be ring closed to the compounds of the Formula I as described above. Alternatively, without resolution, the crude containing both stereoisomers can be ring closed as described above to compounds of the Formula I.

The foregoing is a description of a main synthetic route to the compounds of the Formula I above. It will be readily apparent to those skilled in the art that variations in these preparative techniques are possible.

The following examples are illustrative but not limitative of the present invention. All temperatures stated therein are in degrees centigrade.

EXAMPLE 1

2-amino-5-chloro-benzophenone (60.0 gm., 0.258 mol.) in ethanolamine (400 ml., 400 gm., 6.66 mols.) was stirred and refluxed for 4 hrs. The solution was then cooled and poured into water (800 ml.), and the resulting precipitate recovered by filtration. The crude product was dissolved in methylene chloride, the solution was washed with water, dried ($Na_2SO_4$) and evaporated to give 2-(2-amino-5-chloro-α-phenylbenzylideneamino)ethanol as a mixture of brown gum and crystals. This was extracted several times with hot hexane, and then the insoluble residue was recrystallized from aqueous ethanol, to give the product as tan-colored crystals, M.P. 118–120°.

EXAMPLE 2

2 - methylamino - 5 - chlorobenzophenone (20.0 gm., 0.0813 mol.) in ethanolamine (200 ml., 200 gm., 3.33 mols.) was stirred and refluxed for 4 hrs., then cooled and poured into 2 l. of water. The resulting oily precipitate was washed with water several times by decantation, and was then dissolved in methlene chloride. The solution was washed with water, dried ($Na_2SO_4$) and evaporated, to give 2-(2-methylamino-5-chloro-α-phenylbenzyl-ideneamino)ethanol as a very viscous yellow oil.

EXAMPLE 3

2 - (2 - amino - 5 - chloro-α-phenylbenzylideneamino) ethanol (2.75 gm., 10 mm.) in methylene chloride (20 ml.) and pyridine (1 drop) was stirred in an ice-bath and treated dropwise with a solution of thionyl chloride (1.8 ml., 3.0 gm., 25 mm.) in methylene chloride (10 ml.) during 1 hr., with protection from atmospheric moisture. The mixture was then stirred and refluxed for 2 hrs., and evaporated in vacuo. The resulting yellow crystalline residue (3.79 gm.) was added carefully to a mixture of excess ice-cold N-sodium hydroxide solution and methylene chloride; the organic layer was washed with water, dried ($Na_2SO_4$), and evaporated, to give a pale brown partially crystalline residue. Recrystallization from hexane and from ether-pentane gave 2-(2-amino-5-chloro-α-phenyl-benzylideneamino)-ethyl chloride as yellow prisms, M.P. 71–73°.

EXAMPLE 4

2 - (2 - methylamino - 5 - chloro-α-phenylbenzylideneamino)ethanol as a yellow oil obtained from the procedure described above in Example 2 (10.77 gm., 37.3 mm.) in methylene chloride (100 ml.) and pyridine (1 drop) was treated with a solution of thionyl chloride (6.65 ml., 11.0 gm., 93 mm.) in methylene chloride (25 ml.), and 2 - (2 - methylamino-5-chloro-α-phenylbenzyl-ideneamino)ethyl chloride was isolated in the manner described in Example 3 when effecting the isolation of 2-(2-amino-5-chloro-α-phenylbenzylideneamino)ethyl chloride. The crude product was obtained as a dark-colored oil. It was dissolved in benzene, and filtered through a column of Woelm activity I neutral alumina (200 gm.). Evaporation of the eluates gave 2-(2-methylamino-5-chloro-α-phenylbenzylideneamino)ethyl chloride which upon recrystallization from hexane and from ether/pentane appeared as yellow prisms of M.P. 75–76°.

EXAMPLE 5

2 - (2 - amino - 5 - chloro-α-phenylbenzylideneamino) ethyl chloride (0.25 gm.) contained in an open test-tube was immersed in an oil-bath at 150° and heated, with stirring for 20 min. The material melted and then resolidified to give crude 7-chloro-2,3-dihydro-5-phenyl-1H-1,4-benzodiazepine hydrochloride as an orange solid. This was converted to the free base by treatment with dilute sodium hydroxide solution, and extration with methylene chloride, giving 7 - chloro - 2,3-dihydro-5-phenyl-1H-1,4-benzodiazepine as a yellow gum. Trituration with acetone afforded yellow prisms of the product, M.P. 172–173°.

EXAMPLE 6

2 - (2 - methylamino - 5 - chloro-α-phenylbenzylideneamino)ethyl chloride was heated with stirring, in a large test-tube immersed in an oil-bath at 150–155° until the melt largely solidified (after 10 minutes) to give crude 7 - chloro - 2,3 - dihydro-1-methyl-5-phenyl-1H-1,4-benzodiazepine hydrochloride as an orange solid. This was converted to the free base by treatment with dilute aqueous sodium hydroxide and extraction with methylene chloride giving crude 7-chloro-2,3-dihydro-1-methyl-5-phenyl-1H-1,4-benzodiazepine as a light brown gum. The so-obtained product was purified by filtration of a benzene solution through Woelm activity III neutral alumina (10 gm.). Evaporation of the eluates gave an orange gum. Recrystallization from hexane afforded the purified product as pale yellow prisms, M.P. 96–98°.

EXAMPLE 7

2 - methylamino - 5 - chlorobenzophenone imine (3.45 gm., 14.1 mm.) in ethanolamine (20 ml., 20 gm., 328 mm.) was stirred and refluxed for 2 hrs. The mixture was then cooled and poured into water; the resulting sticky precipitate was washed with water by decantation, dissolved in methylene chloride, washed again with water, dried (MgSO$_4$) and the solvent evaporated to give 2-(2-methylamino-5-chloro-α-phenylbenzylideneamino)ethanol as a viscous yellow oil. The base was treated with methanolic hydrogen chloride according to conventional techniques to give the hydrochloride as orange prisms of melting point 212–214°.

EXAMPLE 8

2 - (2 - amino - 5 - chloro-α-phenylbenzylideneamino) ethyl chloride (0.29 gm., 1 mm.) in xylene (5-ml.) was stirred and refluxed for 18½ hrs., and then the solvent was evaporated in vacuo. The residue was extracted with a mixture of dilute hydrochloric acid and ether; the aqueous layer was made basic with dilute sodium hydroxide and extracted with methylene chloride. Evaporation of this extract gave crude 7-chloro-2,3-dihydro-5-phenyl-1H-1,4-benzodiazepine as a yellow gum which crystallized on trituration with acetone to give yellow prisms of the purified product, M.P. 169–171°.

EXAMPLE 9

2 - (2 - amino - 5 - chloro-α-phenylbenzylideneamino) ethylchloride (0.29 gm., 1 mm.) in quinoline (5 ml.) was stirred and heated in an oil bath at 150° for 1½ hr. and then the reaction mixture was poured into water (50 ml.). The crude product was recovered by extraction with methylene chloride, and obtained as a brown oil which was further purified in the manner described in Example 8 above yielding 7-chloro-2,3-dihydro-5-phenyl-1H-1,4-benzodiazepine, M.P. 170–172°.

EXAMPLE 10

2 - (2 - amino - 5 - chloro-α-phenylbenzylideneamino) ethylchloride (0.29 gm., 1 mm.) in ethanol (10 ml.) was treated with sodium carbonate (0.2 gm., 1.9 mm.) and the mixture was stirred and refluxed for 18 hrs. The product was isolated in the manner described in Example 8 above and obtained as a yellow gum. Trituration with acetone afforded 7 - chloro-2,3-dihydro-5-phenyl-1H-1,4-benzodiazepine M.P. 169–172°.

EXAMPLE 11

2 - (2 - methylamino - 5 - chloro-α-phenylbenzylideneamino)ethyl-chloride (1 gm., 3.26 mm.) in N,N-dimethylformamide (10 ml.) was heated in an oil-bath at 120° for 17 hrs. and then at 150° for 20 min. The resultant mixture was then cooled, poured into dilute sodium carbonate solution and extracted with methylene chloride. The extract was evaporated and the residue extracted with a mixture of dilute hydrochloric acid and ether, which was allowed to stand overnight at room temperature to hydrolyze any unreacted starting material. The aqueous layer was made basic with dilute sodium hydroxide solution, the product was recovered by extraction with ether and obtained as a dark brown gum. This was dissolved in benzene and the solution was filtered through a column of Woelm neutral alumina, activity III (3 gm.). Evaporation of the eluates gave crude 7-chloro-2,3-dihydro-1-methyl-5-phenyl-1H-1,4-benzodiazepine as an orange gum. Trituration with hexane afforded orange crystals of 7-chloro-2,3-dihydro - 1 - methyl - 5 - phenyl-1H-1,4-benzodiazepine melting point 94–98°.

EXAMPLE 12

The procedure described in Example 11 was repeated using dimethylsulfoxide (10 ml.) instead of dimethylformamide. Isolation and purification of the product in the same manner as described in Example 11 gave 7-chloro-2,3-dihydro-1-methyl-5-phenyl-1H-1,4 - benzodiazepine as an orange brown gum. Trituration with hexane containing a small amount of ether afforded orange tan colored crystals of the products, M.P. 95–98°.

EXAMPLE 13

To a solution of 2-(2-methylamino-5-chloro-α-phenylbenzylideneamino)ethylchloride (2 gm., 6.5 mm.) in bis (2-methoxyethyl)ether 20 ml. was added sodium carbonate (0.69 gm., 6.5 mm.), and the mixture was stirred and refluxed for 42 hrs. Isolation and purification of the product as described in Example 11 above gave 7-chloro-2,3-dihydro - 1 - methyl-5-phenyl-1H-1,4-benzodiazepine as a dark red oil. Recrystallization from hexane afforded yellow prisms of the product, M.P. 96–98°.

We claim:

1. A compound selected from the group consisting of compounds of the formula

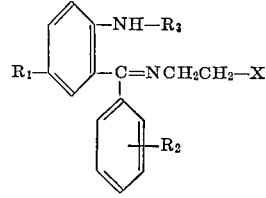

wherein $R_1$ is selected from the group consisting of halogen, nitro, trifluoromethyl and hydrogen; $R_2$ is selected from the group consisting of hydrogen and halogen; $R_3$ is selected from the group consisting of hydrogen and lower alkyl and X is selected from the group consisting of halogen, alkyl sulfonyl and tosyl.

2. A compound of the formula defined in claim 1, wherein X is selected from the group consisting of chlorine and bromine.

3. A compound as defined in claim 2 wherein $R_2$ is hydrogen and $R_1$ is halogen, i.e. a compound of the formula 2-(2-$R_3$amino-5-halo-α-phenylbenzylidineamino)ethyl X' wherein $R_3$ is selected from the group consisting of hydrogen and lower alkyl and X' is selected from the group consisting of chlorine and bromine.

4. A compound as defined in claim 3 wherein $R_3$ is methyl, the "5-halo" group is chlorine and X' is chlorine, i.e. a compound of the formula 2-(2-methylamino-5-chloro-α-phenylbenzylideneamino)ethyl chloride.

5. A compound as defined in claim 3 wherein $R_3$ is hydrogen, the "5-halo" group is chlorine and X' is chlorine, i.e. a compound of the formula 2-(2-amino-5-chloro-α-phenylbenzylideneamino)ethylchloride.

References Cited

UNITED STATES PATENTS

| | | | |
|---|---|---|---|
| 3,243,427 | 3/1966 | Reeder et al. | 260—239 |
| 3,376,290 | 4/1968 | Fryer et al. | 260—239.3 |
| 3,429,913 | 2/1969 | Bell | 260—490 |

LEON ZITVER, Primary Examiner

G. A. SCHWARTZ, Assistant Examiner

U.S. Cl. X.R.

260—239